United States Patent
Gornowicz et al.

(10) Patent No.: US 6,759,487 B2
(45) Date of Patent: Jul. 6, 2004

(54) THERMOPLASTIC POLYURETHANE-SILICONE ELASTOMERS

(75) Inventors: Gerald Alphonse Gornowicz, Longboat Key, FL (US); Craig Steven Gross, Midland, MI (US); Mark Daniel Hartmann, Midland, MI (US); Jun Liao, Midland, MI (US); Jeffrey Paul Sage, Midland, MI (US); Gifford Neale Shearer, Midland, MI (US); Thomas John Tangney, Copley, OH (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/278,532

(22) Filed: Oct. 23, 2002

(65) Prior Publication Data

US 2003/0109623 A1 Jun. 12, 2003

Related U.S. Application Data

(60) Provisional application No. 60/347,785, filed on Oct. 23, 2001, and provisional application No. 60/411,253, filed on Sep. 16, 2002.

(51) Int. Cl.$^7$ .............................................. C08L 83/06
(52) U.S. Cl. ....................................... 525/478; 524/588
(58) Field of Search ........................... 525/478; 524/588

(56) References Cited

U.S. PATENT DOCUMENTS

| | | | |
|---|---|---|---|
| 4,164,491 A | 8/1979 | Itoh et al. | 260/37 |
| 4,500,688 A | 2/1985 | Arkles | 525/431 |
| 4,647,643 A | 3/1987 | Zdrahala et al. | 528/28 |
| 4,714,739 A * | 12/1987 | Arkles | 525/92 |
| RE33,070 E | 9/1989 | Arkles | 525/431 |
| 5,017,322 A * | 5/1991 | Brooks | 264/255 |
| 5,861,450 A * | 1/1999 | Chen et al. | 524/269 |
| 5,934,663 A | 8/1999 | Saito et al. | 271/109 |
| 6,013,715 A | 1/2000 | Gornowicz et al. | 524/492 |
| 6,153,691 A * | 11/2000 | Gornowizc | 524/861 |
| 6,362,287 B1 | 3/2002 | Chorvath et al. | 525/431 |
| 6,362,288 B1 | 3/2002 | Brewer et al. | 525/431 |
| 6,417,293 B1 | 7/2002 | Chorvath et al. | 525/446 |

* cited by examiner

*Primary Examiner*—Margaret G. Moore
(74) *Attorney, Agent, or Firm*—Alan Zombeck

(57) ABSTRACT

Re-processable thermoplastic elastomer composition comprising (A) a thermoplastic polyurethane polymer, and (B) a silicone elastomer, wherein the weight ratio of the silicone elastomer to the thermoplastic polyurethane polymer is from 5:95 to 85:15, are disclosed along with methods for making such compositions.

28 Claims, No Drawings

THERMOPLASTIC POLYURETHANE-SILICONE ELASTOMERS

CROSS-REFERENCE

This application is related to and claims priority of U.S. Provisional Patent Application Serial No. 60/347,785, filed Oct. 23, 2001, and U.S. Provisional Patent Application Serial No. 60/411,253, filed Sep. 16, 2002.

FIELD OF THE INVENTION

This invention provides re-processable thermoplastic elastomer compositions comprising a thermoplastic polyurethane polymer and a silicone elastomer and methods for making them.

BACKGROUND OF THE INVENTION

Thermoplastic elastomers (TPEs) are polymeric materials which possess both plastic and rubbery properties. They have elastomeric mechanical properties but, unlike conventional thermoset rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melting point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results. Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate).

Polyurethanes are an important class of thermoplastics finding utility in a variety of commercial applications. The physical properties of polyurethanes typically can be adjusted for various applications through the selection of the type and amount of starting materials (for example polyol, isocyanate, and chain extender) used in the composition. Alternatively, compounding polyurethanes with other polymers or materials can alter their physical properties.

Several attempts have been made to combine polyurethane with silicones to create unique compositions. U.S. Pat. No. 4,647,643 discloses, for example, soft non-blocking polyurethanes which are prepared by reacting a long chain polyester or polyether diol, a short chain diol, a diisocyanate and a silicone diol.

Arkles, in U.S. Pat. No. 4,500,688, discloses semi-interpenetrating networks (semi-IPNs) wherein a vinyl-containing silicone fluid having a viscosity of 500 to 100,000 cS is dispersed in a conventional thermoplastic resin. Typical thermoplastics mentioned include polyesters, polyurethanes, styrenics, polyacetals and polycarbonates. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions or to the specific nature of the organic resin. Furthmore, Arkles provides no teaching on how to improve the physical properties of polyurethanes upon long term exposure to heat.

Thermoplastic silicone vulcanizates (TPSiVs as discussed supra) have been prepared by condensation cure of a thermoplastic resin and a silanol-terminated diorganopolysiloxanes in a dynamic vulcanization process, as disclosed in U.S. Pat. No. 6,153,691. While the thermoplastic resin of the '691 patent included polyurethanes, no specific polyurethane based compositions having improved physical properties are taught therein.

U.S. Pat. No. 4,164,491 discloses thermally curable silicone rubber compositions comprising diorganopolysiloxanes gum, a polyurethane elastomer having a softening point of not lower than 100° C., a reinforcing filler, and an organic peroxide. However, the resulting cured products from the '491 patent are taught to be "silicone rubber" and thus not re-processable.

Despite these advances in the art of polyurethane compositions, a need still exists to further identify polyurethane compositions with improved physical properties. In particular, there is a need for polyurethane compositions with lower durometer values (hardness) without sacrificing overall strength. Additionally, there is a need to identify polyurethane compositions that retain physical property profiles after exposure to heat (for example at 120–150° C.) for extended periods of time. Furthermore, there is a need to identify such polyurethane compositions that are re-processable.

The present inventors have discovered re-processable thermoplastic elastomer compositions that are produced in a dynamic vulcanization process from a thermoplastic polyurethane polymer and a silicone elastomer. The compositions of the present invention possess unique physical properties vs previously disclosed polyurethane-silicone compositions. Furthermore, many physical properties, such as hardness, tensile strength, elongation, and compression set remain similar, or degrade little, when the compositions are exposed to heat for extended periods of time.

SUMMARY OF THE INVENTION

The present invention is directed to a thermoplastic elastomer composition comprising;

(A) a thermoplastic polyurethane polymer, (B) a silicone elastomer, wherein the weight ratio of the silicone elastomer to the thermoplastic polyurethane polymer is from 5:95 to 85:15, and the thermoplastic elastomer composition is re-processable.

The invention also provides a method making thermoplastic elastomer compositions comprising:

(I) mixing (A) a thermoplastic polyurethane polymer, (B) a silicone base comprising;

(B') 100 parts by weight of a diorganopolysiloxane gum having a plasticity of at
least 30 and having an average of at least 2 alkenyl groups in its molecule and, optionally, (B") up to 200 parts by weight of a reinforcing filler, the weight ratio of said silicone elastomer to said thermoplastic polyurethane resin is from 5:95 to 85:15, (C) an organohydrido silicon compound which contains an average of at least 2 silicon-bonded hydrogen groups in its molecule and (D) a hydrosilation catalyst, components (C) and (D) being present in an amount sufficient to cure said diorganopolysiloxane (B'); and (II) dynamically vulcanizing said diorganopolysiloxane (B').

DETAILED DESCRIPTION OF THE INVENTION

Component (A) of the present invention is (A') a thermoplastic polyurethane polymer, or a blend of at least one such thermoplastic polyurethane polymer with (A") a non-polyurethane thermoplastic resin. As used herein, the term "polymer" encompasses homopolymers, copolymers, or terpolymers.

Thermoplastic polyurethane polymers are known in the art and are typically obtained by the reaction of a linear hydroxy-terminated polyol, (mostly polyester polyols or polyether polyols), organic diisocyanate, and a chain extender (often a short chain diol). Representative of the types of linear hydroxy-terminated polyols, organic diisocyanates, and a chain extenders useful as reaction components to prepare the thermoplastic polyurethane polymers of the present invention are described, for example in; *Encyclopedia of Chemical Technology* 3$^{rd}$ *edition, Volume 23*, "Urethane Polymers", pages 576–608, (Wiley & Sons, NY), *Encyclopedia of Polymer Science and Engineering Volume 13*, "Polyurethanes", pages 243–303 (Wiley & Sons, NY), and in U.S. Pat. Nos. 5,905,133, 5,908,894, 6,054,533, all of which are hereby incorporated by reference.

Methods for preparing the thermoplastic polyurethane polymers useful as component (A) in the present invention are well known. Typically, the linear hydroxy-terminated polyol, organic diisocyanate, and chain extender, are reacted along with optional catalysts and auxiliary substances and/or additives, in quantities such that the equivalent ratio of NCO groups to the sum of the groups reactive with isocyanate, in particular the OH groups of the low-molecular diols/triols and polyols, typically ranges from 0.9:1.0 to 1.1:1.0, or alternatively from 0.95:1.0 to 1.10:1.0.

While any thermoplastic polyurethane polymer can be used as component (A') in the present invention, typically component (A') is selected from one or more thermoplastic polyurethane elastomers, commonly referred to as TPU's. TPU's are well known in the art, as well as their method for making them. Representative, non-limiting examples of TPU's which can comprise component (A') of the present invention include: polyester polyadipate based polyurethane, such as Pellethane® 2355-80AE (Dow Chemical, Midland, Mich.); polyether and polyester based polyurethane, such as Pellethane® 2102 (Dow Chemical, Midland, Mich.), Pellethane® 2103 (Dow Chemical, Midland, Mich.), Elastollan® C series, Elastollan® 600 series, and Elastollan® S series (BASF, Germany).

Specific non-limiting representative examples of TPU's which can comprise component (A') of the present invention include:

BASF Elastollan® C60A10W: >65% of thermoplastic polyurethane and <35% of plasticizer BASF Elastollan® C70A10W: >75% of thermoplastic polyurethane and <25% of plasticizer BASF Elastollan® C78A15: 100% of thermoplastic BASF Elastollan® S80A15: 100% of thermoplastic BASF Elastollan® 688A10N: 100% of thermoplastic BASF Elastollan® B80A11: 100% of thermoplastic Dow Pellethane® 2102-75A: >98% of thermoplastic polyurethane from methylenediphenyl diisocyanate, 1,4-butanediol and 2-oxepanone and <2% of additives Dow Pellethane® 2102-80A: >98% of thermoplastic polyurethane from methylenediphenyl diisocyanate, 1,4-butanediol and 2-oxepanone and <2% of additives Dow Pellethane® 2355-75A: >98% of thermoplastic polyurethane from methylenediphenyl diisocyanate, 1,4-butanediol and polybutylene adipate and <2% of additives Dow Pellethane® 2103-70A: >98% of thermoplastic polyurethane from methylenediphenyl diisocyanate, 1,4-butanediol and polytetramethylene glycol and <2% of additives Dow Pellethane® 2103-80AE: >98% of thermoplastic polyurethane from methylenediphenyl diisocyanate, 1,4-butanediol and polytetramethylene glycol and <2% of additives Bayer Texin® 985 (U): Aromatic thermoplastic polyurethane Bayer Texin® 990R: Aromatic thermoplastic polyurethane Bayer Texin® DP7-1165: Aromatic thermoplastic polyurethane Bayer Desmopan® KU2-8651: Aromatic thermoplastic polyurethane Bayer Desmopan® 385: Aromatic thermoplastic polyurethane Component (B) is a silicone elastomer which is the reaction product of a silicone base comprising a diorganopolysiloxane gum (B'), an optional reinforcing filler (B"), and components (C), (D) which are defined infra. Diorganopolysiloxane (B') is a high consistency (gum) homopolymer or copolymer which contains at least 2 alkenyl groups having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. Typically, the alkenyl group is vinyl or hexenyl and that this group is present at a level of 0.001 to 3 weight percent, alternatively 0.01 to 1 weight percent, in the diorganopolysiloxane gum.

The remaining (i.e., non-alkenyl) silicon-bonded organic groups in component (B') are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, of course, that these groups are selected such that the diorganopolysiloxane gum (B') has a glass temperature (or melt point) which is below room temperature and the gum is therefore elastomeric. Methyl typically makes up at least 50, or alternatively at least 90 mole percent of the non-alkenyl silicon-bonded organic groups in component (B').

Thus, diorganopolysiloxane (B') can be a homopolymer or a copolymer containing such organic groups. Examples include guns comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by linear and partially branched straight-chain.

Specific illustrations of diorganopolysiloxane (B') include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Typical systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is 93%.

Component (B') may also include combinations of two or more diorganopolysiloxanes. Typically, component (B') is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least 30 as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. When the plasticity of this component is less than 30, as in the case of the low viscosity fluid siloxanes employed by Arkles, cited supra, the TPSiVs prepared by dynamic vulcanization according to the instant method exhibit poor uniformity such that at high silicone contents (e.g., 50 to 70 weight percent) there are regions of essentially only silicone and those of essentially only thermoplastic resin, and the compositions are weak and friable. These gums are considerably more viscous than the silicone fluids employed in the prior art. For example, silicones contemplated by Arkles, cited supra, have an upper viscosity limit of 100,000 cS (0.1 m$^2$/s) and, although the plasticity of fluids of such low viscosity are not readily measured by the ASTM D 926 procedure, it was determined that this corresponds to a plasticity of approximately 24. Although there is no absolute upper limit on the plasticity of component (B'), practical considerations of processability in conventional mixing equipment generally restrict this value. Typically, the plasticity number should be 100 to 200, or alternatively 120 to 185.

Methods for preparing high consistency unsaturated group-containing diorganopolysiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

Optional component (B'') is a finely divided filler which is known to reinforce diorganopolysiloxane (B') and is typically selected from finely divided, heat stable minerals such as fumed and precipitated forms of silica, silica aerogels and titanium dioxide having a specific surface area of at least 50 m$^2$/gram. The fumed form of silica is a typical reinforcing filler based on its high surface area, which can be up to 450 m$^2$/gram and a fumed silica having a surface area of 50 to 400 m$^2$/g, or alternatively 200 to 380 m$^2$/g. Typically, the fumed silica filler is treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creeping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. Alternatively, the treating compound is an oligomeric hydroxy-terminated diorganopolysiloxane having an average degree of polymerization (DP) of 2 to 100, or alternatively 2 to 10, and it is used at a level of 5 to 50 parts by weight for each 100 parts by weight of the silica filler. When component (B') is the vinyl-functional or hexenyl-functional polydimethylsiloxane, this treating agent is typically a hydroxy-terminated polydimethylsiloxane.

When reinforcing filler (B'') is employed, it is added at a level of up to 200 parts by weight, alternatively 5 to 150 or alternatively 20 to 100 parts by weight, for each 100 parts by weight of gum (B') to prepare silicone elastomer (B). Such a blend is commonly termed a "base" by those skilled in the silicone art. Blending is typically carried out at room temperature using a two-roll mill, internal mixer or other suitable device. Alternatively, a reinforcing filler-containing silicone elastomer can be formed in-situ during mixing, but prior to dynamic vulcanization of the gum, as further described infra. In the latter case, the temperature of mixing is kept below the melting point of the polyester resin until the reinforcing filler is well dispersed in the diorganopolysiloxane gum.

Component (C) is an organohydrido silicon compound that can function as a crosslinker (cure agent) for diorganopolysiloxane (B') of present composition and is an organopolysiloxane which contains at least 2 silicon-bonded hydrogen atoms in each molecule, but having at least 0.1 weight percent hydrogen, alternatively 0.2 to 2 or alternatively 0.5 to 1.7, percent hydrogen bonded to silicon. Those skilled in the art will, of course, appreciate that either component (B') or component (C), or both, should have a functionality greater than 2 if diorganopolysiloxane (B') is to be cured (i.e., the sum of these functionalities must be greater than 4 on average). The position of the silicon-bonded hydrogen in component (C) is not critical, and it may be bonded at the molecular chain terminals, in non-terminal positions along the molecular chain, or at both positions. The silicon-bonded organic groups of component (C) are independently selected from any of the hydrocarbon or halogenated hydrocarbon groups described above in connection with diorganopolysiloxane (B'), including embodiments thereof. The molecular structure of component (C) is also not critical and is exemplified by straight-chain, partially branched straight-chain, branched, cyclic and network structures, linear homopolymers or copolymers.

Component (C) is exemplified by the following:

low molecular siloxanes, such as $PhSi(OSiMe_2H)_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;
tetrakis(dimethylhydrogensiloxy)silane;
silicone resins composed of $(CH_3)_2HSiO_{1/2}$, $(CH_3)_3SiO_{1/2}$, and $SiO_{4/2}$ units; and
silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units,
wherein Ph hereinafter denotes phenyl group.

Typical organohydrido silicon compounds are homopolymers or copolymers with R""HSiO units ended with either R""$_3$SiO$_{1/2}$ or HR""$_2$SiO$_{1/2}$, wherein R"" is independently selected from alkyl groups having 1 to 20 carbon atoms, phenyl or trifluoropropyl. R"" is typically methyl. Also typically the viscosity of component (C) is 0.5 to 1,000 mPa-s at 25° C., alternatively 2 to 500 mPa-s. Further, this component typically has 0.5 to 1.7 weight percent hydrogen bonded to silicon and is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. Typically, such a system has terminal groups selected from trimethylsiloxy or dimethylhydridosiloxy groups. These SiH-functional materials are well known in the art and many of them are commercially available.

Component (C) may also be a combination of two or more of the above described systems and is used at a level such that the molar ratio of SiH therein to Si-alkenyl in component (B') is greater than 1 and typically below 50, alternatively 3 to 30, or alternatively 4 to 20.

Hydrosilation catalyst (D) accelerates the cure of diorganopolysiloxane (B') in the present composition. This hydrosilation catalyst is exemplified by platinum catalysts, such as platinum black, platinum supported on silica, platinum supported on carbon, chloroplatinic acid, alcohol solutions of chloroplatinic acid, platinum/olefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (D) is typically a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al. Typically, catalyst (E) is a neutralized complex of platinous chloride and divinyltetramethyldisiloxane.

Component (D) is added to the present composition in a catalytic quantity sufficient to promote the reaction of components (B') and (C) and thereby cure the diorganopolysiloxane to form an elastomer. The catalyst is typically added so as to provide 0.1 to 500 parts per million (ppm) of metal atoms based on the total weight of the thermoplastic elastomer composition, alternatively 0.25 to 100 ppm.

A stablilizer, component (E), can optionally be added to the compositions of the present invention. Stabilizer (E) can be selected from any stabilizer known in the art that prevents degradation of thermoplastics at higher temperatures, such as antioxidant compounds or formulated products. Typically, stabilizer (E) comprises at least one organic compound selected from hindered phenols; thioesters; hindered amines; 2,2'-(1,4-phenylene)bis(4H-3,1-benzoxazin-4-one); or 3,5-di-tert-butyl-4-hydroxybenzoic acid, hexadecyl ester. Examples of organic compounds suitable as stabilizer (E) in the present invention are disclosed in U.S. Pat. No. 6,417,293, which is hereby incorporated by reference.

Typical stabilizers useful in the present invention are tetrakis(methylene(3,5-di-tert-butyl-4-hydroxyhydrocinnamate))methane, N,N'-hexamethylenebis(3,5-di-tert-butyl-4-hydroxyhydrocinnamamide), and Benzenamine, N-phenyl-, reaction products with 2,4,4-trimethylpentene (for example Irganox 5057 from Ciba Specialty Chemicals).

From 0.01 to 5 parts by weight of stabilizer (E) are employed for each 100 parts by weight of thermoplastic polyurethane polymer (A) plus silicone elastomer (B). Typically, 0.1 to 2 parts by weight, alternatively 0.1 to 1 part by weight, of (E) are added for each 100 parts by weight of (A) plus (B).

In addition to the above-mentioned components (A) through (E), a minor amount (i.e., less than 40 weight percent of the total composition, typically less than 20 weight percent) of an optional additive (F) can be incorporated in the compositions of the present invention. This optional additive can be illustrated by, but are not limited to, fillers, such as glass fibers and carbon fibers, quartz, talc, calcium carbonate, diatomaceous earth, iron oxide, carbon black and finely divided metals; lubricants; plasticizers; dispersing agents, polydimethylsiloxane fluids; pigments; dyes; anti-static agents; blowing agents; heat stabilizers, such as hydrated cerric oxide; antioxidants; and fire retardant (FR) additives, such as halogenated hydrocarbons, alumina trihydrate, magnesium hydroxide, calcium silicate, wollastonite, and organophosphorous compounds.

Optional additives (F) are typically added to the final thermoplastic composition after dynamic vulcanization, but they may also be added at any point in the preparation provided they do not adversely affect dynamic vulcanization. Of course, the above additional ingredients are only used at levels which do not significantly detract from the desired properties of the final composition.

For the purposes of the present invention, the weight ratio of silicone elastomer (B) to thermoplastic polyurethane polmer (A) is from 5:95 to 85:15, alternatively from 30:70 to 70:30, or alternatively from 40:60 to 60:40. It has been found that when this ratio is less than 5:95, the resulting composition has physical properties more resembling that of the thermoplastic polyurethane polymer (A). On the other hand, the above mentioned ratio should be no more than 85:15 since the compositions tend to be weak and resemble cured silicone elastomers above this value. Notwithstanding this upper limit, the maximum weight ratio of (B) to (A) for any given combination of components is also limited by processability considerations since too high a silicone elastomer content results in at least a partially crosslinked continuous phase which is no longer thermoplastic. For the purposes of the present invention, this practical limit is readily determined by routine experimentation and represents the highest level of component (B) which allows the compositions to be compression molded.

The thermoplastic elastomer compositions of the present invention are re-processable. As used herein "re-processable" means the compositions can be readily processed in other conventional plastic operations, such as injection molding and blow molding. Typically, the present thermoplastic elastomer compositions that are subsequently re-processed generally exhibit physical properties (for example, tensile strength, elongation, compression set, and hardness) similar to their original values (i.e., the thermoplastic elastomer is little changed by this re-processing).

Although not to be limited by any theory, the present inventors believe the compositions of the present invention are re-processable as an inherent result of the manner in which the silicone elastomer is mixed the polyurethane polymer. Typical, but not required in the compositions of the present invention, the silicone elastomer is dispersed primarily as distinct particles in the polyurethane polymer. In other words, the silicone elastomers particles are dispersed as an "internal phase" in the polyurethane polymer, which can be considered as a "continuous phase". Typically, the silicone elastomer particles have an average particle size of less than 30 micrometers, alternatively less than 20 micrometers, or alternatively less than 10 micrometers. As used herein, "average particle size" means area average particle size that is typically determined by evaluating a representative sample of the composition by microscopic techniques for the average area of the internal silicone elastomer particles. Alternatively, the compositions of the present invention can have a co-continuous morphology where the silicone elastomer and polyurethane polymer are mixed in such a manner so as to create two simultaneous continuous phases (one each of silicone elastomer and polyurethane polymer), where neither phase is considered to be the internal phase or continuous phase. Such compositions are considered to be within the scope of the present invention providing they are re-processable as defined supra.

The compositions of the present invention can further possess physical properties that are unique vs. the physical properties of the starting polyurethane polymer or silicone elastomer, or vs. simple mixtures of the two. Physical properties such as; tensile strength, tensile set, elongation, compression set, hardness, abrasion resistance, coefficient of friction, either tested initially on the compositions, or after heat aging, provide the basis for various embodiments of the present compositions.

In one embodiment, the thermoplastic elastomer composition has a hardness value as measured according to ASTM D2240 (Shore A) that is 10 points lower, alternatively 20 points lower, or alternatively 50 points lower than the thermoplastic polyurethane polymer in the absence of a plasticizer. As used herein, "absence of a plasticizer" means that materials known in the art as plasticizers, are not added to the thermoplastic elastomer compositions of the present invention.

In another embodiment, mechanical properties selected from tensile strength, elongation at break, and hardness of the thermoplastic elastomer composition decreases no more than 60%, alternatively 40%, or alternatively 30% from its original value after heat aging the thermoplastic elastomer composition at 120° C. at least for 1000 hours. "Heat aging" refers to the process of subjecting a sample of the thermoplastic elastomer at an elevated temperature for a given period of time at normal atmospheric conditions, for example, typically in an air-circulated oven. ASTM D573-99 is exemplary of such heat aging techniques. For purposes of this invention, tensile strength and elongation at break is as defined in ASTM D412 (Die D), and the hardness as defined in ASTM D2240.

In yet another embodiment, the thermoplastic elastomer composition has a compression set at elevated temperatures (for example, 120° C.) as measured according to ASTM D395 (Method B) that is 5 percent lower, alternatively 10 percent lower, or alternatively 30 percent lower than the thermoplastic polyurethane polymer.

The thermoplastic elastomers of the present invention can be prepared by thoroughly mixing silicone elastomer (B) with the thermoplastic polyurethane polymer (A) according to any known mixing techniques, providing the resulting mixture provides a re-processable thermoplastic silicone elastomer as described supra. Typically, the thermoplastic silicone elastomers can be prepared by mixing the thermoplastic polyurethane polymer (A), the diorganopolysiloxanes (B'), optional filler (B"), and dynamically vulcanizing the diorganopolysiloxane using organohydrido silicon compound (C) and catalyst (D). Optional stabilizer (E) can be added at any point, but typically is added following thorough mixing of components (A), (B) and (C), but before the addition of component (D).

The present invention also provides a method for preparing a thermoplastic elastomer comprising:

(I) mixing
   (A) a thermoplastic polyurethane polymer,
   (B) a silicone base comprising
      (B') 100 parts by weight of a diorganopolysiloxane gum having a Williams plasticity of at least 30 and having an average of at least 2 alkenyl groups in its molecule and, optionally,
      (B") up to 200 parts by weight of a reinforcing filler, the weight ratio of said silicone elastomer to said thermoplastic polyurethane polymer is from 5:95 to 85:15,
   (C) an organohydrido silicon compound which contains an average of at least 2 silicon-bonded hydrogen groups in its molecule and
   (D) a hydrosilation catalyst, components (C) and (D) being present in an amount sufficient to cure said diorganopolysiloxane (B'); and
(II) dynamically vulcanizing said diorganopolysiloxane (B').

Mixing is carried out in any device which is capable of uniformly dispersing the components in the thermoplastic polyurethane polymer, such as an internal mixer or an extruder, the latter being typical for commercial preparations, wherein the temperature is typically kept as low as practical consistent with good mixing so as not to degrade the resin. Depending upon the particular system, order of mixing is generally not critical and, for example, components (A) and (C) can be added to (B) at a temperature above the softening point of (A), catalyst (D) then being introduced to initiate dynamic vulcanization. Typically, components (B) through (D) should be well dispersed in thermoplastic polyurethane polymer (A) before dynamic vulcanization begins.

An alternative embodiment for mixing involves creating a premix of components (B), (C), (D), (E), and (F). This premix is then added to component (A) with subsequent heating which initiates the vulcanization process. The present inventors have found this mode of mixing requires less crosslinker and catalyst, especially when (F) is a polydimethylsiloxane fluid, such as Dow Corning® 200 fluid (1000 cs), which offers potential economical processing. Alternatively, catalyst (D) and optionally, (F), a polydimethylsiloxane fluid can be premixed prior to addition to the other components.

As previously mentioned, it is also contemplated that a reinforcing filler-containing silicone elastomer can be formed in-situ. For example, the optional reinforcing filler may be added to a mixer already containing thermoplastic polyurethane polymer (A) and diorganopolysiloxane gum (B') at a temperature below the softening point of the resin to thoroughly disperse the filler in the gum. The temperature is then raised to melt the resin, the other ingredients are added and mixing/dynamic vulcanization are carried out. Optimum temperatures, mixing times and other conditions of the mixing operation depend upon the particular resin and other components under consideration and these may be determined by routine experimentation by those skilled in the art. Typically, however, the mixing and dynamic vulcanization is carried out under a dry, inert atmosphere (i.e., one that does not adversely react with the components or otherwise hinder hydrosilation cure), such as dry nitrogen, helium or argon.

A typical procedure according to the instant method comprises forming a pre-mix by blending thermoplastic polyurethane polymer (A), silicone base (B), and, optionally, organohydrido silicon compound (C) below the softening point of the resin (e.g., at ambient conditions). This pre-mix is then melted in a bowl mixer or internal mixer, typically using a dry inert gas purge, at a controlled temperature which is just above the softening of the resin to 35° C. above this value and catalyst (D) is mixed therewith. Mixing is continued until the melt viscosity (mixing torque) reaches a steady state value, thereby indicating that dynamic vulcanization of the diorganopolysiloxane of component (B) is complete. Alternatively, similar mixing procedures can be conducted continuously using an extrusion process, for example using a twin screw extruder.

The thermoplastic elastomer compositions prepared according to the methods of the present invention are re-processable, as defined supra. Typically, the thermoplastic elastomeric compositions prepared according to the methods of the present invention can further possess physical properties that are unique vs. the physical properties of the starting polyurethane polymer or silicone elastomer, or vs. simple mixtures of the two. Physical properties such as; tensile strength, tensile set, elongation, compression set, hardness, abrasion resistance, coefficient of friction, either tested initially on the compositions, or after heat aging, provide the basis for various embodiments of the present compositions. In this context, the term "simple blend" or "physical blend" denotes a composition wherein the weight proportions of thermoplastic polyurethane polymer (A) and silicone elastomer (B) are identical to the proportions in the thermoplastic elastomer compositions of the present invention, but no cure agents are employed (i.e., either component (C) or (D), or both, are omitted and the gum is therefore not cured).

The thermoplastic elastomer prepared by the above-described method can then be processed by conventional techniques, such as extrusion, vacuum forming, injection molding, blow molding or compression molding. Moreover, these compositions can be re-processed (recycled) with little or no degradation of mechanical properties.

The novel thermoplastic elastomers of the present invention can be used for fabricating parts and components for automotive, electronics, electrical, communications, appliance and medical applications, inter alia. For example, they may be used to produce wire and cable insulation; automotive and appliance components, such as belts, hoses, boots, bellows, gaskets, fuel line components and air ducts; architectural seals; bottle closures; furniture components; soft-feel grips for hand held devices (e.g. handles for tools); medical devices; sporting goods and general rubber parts.

EXAMPLES

The following examples are presented to further illustrate the compositions and methods of this invention, but are not to be construed as limiting the invention. All parts and percentages in the examples are on a weight basis and all measurements were obtained at 23° C., unless indicated to the contrary.

Materials

The following materials were employed in the examples.

BASE 1 is LCS740 Silastic® Silicone Rubber (Dow Corning Corporation, Midland Mich.).
BASE 2 is HS-70 Silastic® Silicone Rubber (Dow Corning Corporation, Midland Mich.).
BASE 3 is DC 4-4758 Silastic® Silicone Rubber (Dow Corning Corporation, Midland Mich.).
BASE 4 is HS-71 Silastic® Silicone Rubber (Dow Corning Corporation, Midland Mich.).
X-LINKER is an SiH-functional crosslinker consisting essentially of 68.4% MeHSiO units, 28.1% Me$_2$SiO units and 3.5% Me$_3$SiO$_{1/2}$ units and has a viscosity of approximately 29 mPa.s. This corresponds to the average formula MD$_{16}$D'$_{39}$M, in which where M is (CH$_3$)$_3$Si—O—, D is —Si(CH$_3$)$_2$—O— and D' is —Si(H)(CH$_3$)—O—.
CATALYST is a 1.5% platinum complex of 1,3-diethenyl-1,1,3,3-tetramethyldisiloxane; 6% tetramethyldivinyldisiloxane; 92% dimethylvinyl ended polydimethylsiloxane and 0.5% dimethylcyclopolysiloxanes having 6 or greater dimethylsiloxane units.
200 fluid is Dow Corning 200 fluid® (1000 cS) (Dow Corning Corporation, Midland Mich.), a trimethylsiloxy terminated polydimethylsiloxane fluid.
The polyurethane elastomers (TPU's) used were;
TPU 1=BASF Elastollan® C60A10W: >65% of thermoplastic polyurethane and <35% of plasticizer (compositions for both TPU and plasticizer are not disclosed in MSDS by the vendor)
TPU 2=BASF Elastollan® C70A10W: >75% of thermoplastic polyurethane and <25% of plasticizer (compositions for both TPU and plasticizer are not disclosed in MSDS by the vendor)

TPU 3=Dow Pellethane® 2103-70A: >98% of thermoplastic polyurethane from methylenediphenyl diisocyanate, 1,4-butanediol and polytetramethylene glycol and <2% of additives.

TPU 4=BASF Elastollan® S80A15: 100% of thermoplastic (composition for TPU is not disclosed in MSDS by the vendor)

TPU 5=BASF Elastollan® C85A10

TPU 6=Bayer Texin® DP7-1165: Aromatic thermoplastic polyurethane

TPU 7=BASF Elastollan® WY03995-5

TPU 8=BASF Elastollan® 1180A50

TPU 9=Bayer Texin® 985 (U): Aromatic thermoplastic polyurethane

TPU 10=BASF Elastollan® S85A50DPN

The mixing of components was carried out using a 25 mm Werner and Pfleiderer twin screw extruder with the processing section heated to 180° C. to 200° C. and a screw speed of 250 rpm to 500 rpm at an output rate of 10 kg/hr to 20 kg/hr. Test specimens were prepared by injection molding 4.00 inch (10.16 cm)×4.00 inch (10.16 cm)×0.062 inch (0.16 cm) plaques at 180° C. to 200° C. with a mold temperature of 10° C. to 30° C. Die D test bars were cut from the plaques and tested according to ASTM D412 using a laser extensometer to measure elongation.

Examples 1–4

Comparative Examples

Several polyurethane elastomers (TPUs), representative of commercially available materials, were evaluated for heat aging performance. The results are summarized in Table 1.

TABLE 1

| Material | Example 1 TPU 1 | Example 2 TPU 2 | Example 3 TPU 3 | Example 4 TPU 4 |
|---|---|---|---|---|
| Hardness (Shore A) | 68 | 71 | 70 | 81 |
| Ultimate Tensile Strength (MPa) | 39 | 46 | 57 | 68 |
| Elongation at Break (%) | 750 | 800 | 560 | 700 |
| Tensile Set at Break (%) | 68 | 52 | 30 | 68 |
| Tear Strength (N/mm) | 51 | 63 | 54 | 79 |
| Compression set after 22 hrs (%) | | | | |
| Room Temperature | 14 | 16 | 30 | 23 |
| 70° C. | 77 | 83 | 81 | 83 |
| 70° C. after annealed[1] | 37 | 39 | 62 | — |
| 120° C. | 91 | 94 | 118 | 97 |
| 120° C. after annealed[1] | 66 | 70 | 78 | — |
| Specific Gravity (g/cc) | 1.2 | 1.2 | 1.1 | 1.2 |
| Change in Tensile Strength after Heat Aging in Air at 150° C. for 1008 hrs (%) | −92 | −94 | −97 | −94 |
| Change in Elongation at Break after Heat Aging in Air at 150° C. for 1008 hrs (%) | −57 | −57 | −86 | −48 |
| Change in Hardness after Heat Aging in Air at 150° C. for 1008 hrs (Point Change) | −35 | −29 | −28 | −41 |
| Volume Swell in Transmission Oil 90 at 60° C. for 1 hour (%) | −3.7 | −0.9 | +1.6 | +2.1 |
| Volume Swell in SAE 30 wt Motor Oil at 60° C. for 1 hour (%) | −5.8 | −2.8 | +2.6 | +1.4 |
| Volume Swell in Standard Grade Diesel Fuel at 60° C. for 1 hour (%) | −3.1 | −0.2 | +16 | +1.6 |
| Volume Swell in Ethylene glycol/DIH$_2$O @ 50/50 ratio at 60° C. for hour (%) | +1.1 | +0.7 | +1.4 | +1.6 |
| Volume Swell in ASTM 903 Oil at 60° C. for 1 hour (%) | — | — | — | — |

[1]Annealed at 120° C. in air for 22 hrs

Example 5–8

Polyurethane-silicone elastomer compositions were prepared using a 25 mm Werner and Pfleiderer twin screw extruder with the processing section heated to 180° C. to 200° C. and a screw speed of 250 rpm to 500 rpm at an output rate of 10 kg/hr to 20 kg/hr. The formulations and resulting properties are summarized in Table 2. These results show the polyurethane-silicone elastomer compositions maintained their physical property performance after heating aging. In particular, the mechanical properties of tensile strength, elongation at break, the Shore A hardness values did not significantly decrease after heat aging.

TABLE 2

| | Example 5 | Example 6 | Example 7 | Example 8 |
|---|---|---|---|---|
| Formulation (wt %) | | | | |
| TPU 2 | 48.35% | | | |
| TPU 5 | | 48.35% | | |
| TPU 4 | | | 48.35% | |
| TPU 6 | | | | 38.68% |
| TPU 7 | | | | 9.67% |
| BASE 1 | 48.35% | 48.35% | | |
| BASE 4 | | | 48.35% | 48.35% |
| X LINKER | 2.3% | 2.3% | 2.3% | 2.3% |
| CATALYST | 0.1% | 0.1% | 0.1% | 0.1% |
| 200 fluid (1000 cSt) | 0.9% | 0.9% | 0.9% | 0.9% |
| Properties | | | | |
| Hardness (Shore A), ASTM D-2240 | 52 | 65 | 65 | 71 |
| Ultimate Tensile Strength (MPa), ASTM D-412 Die D | 7.1 | 16 | 12 | 16 |
| Elongation at Break (%), ASTM D-412 Die D | 470 | 500 | 720 | 600 |
| Tensile Set at Break (%), ASTM D-412 Die D | | | | |
| At 100% elongation | 5.5 | 6.2 | 10 | 16 |
| At 300% elongation | 20 | 20 | 37 | 80 |
| At break | 24 | 24 | 68 | 80 |
| Tear Strength (N/mm) | 23 | 33 | 44 | 46 |
| Compression set after 22 hrs (%) | | | | |
| Room Temperature | 14 | 12 | 21 | 23 |
| 70° C. | 49 | 59 | — | — |
| 70° C. after annealing[1] | 22 | 39 | — | — |
| 120° C. | 74 | 70 | 95 | 95 |
| 120° C. after annealing[1] | 53 | 41 | 66 | 74 |
| Dielectric Strength at 100 Hz (kV/mm), ASTM D-149 | 19 | 18 | — | — |
| Dielectric Constant at 100 Hz, ASTM D-150 | 4.37 | 4.13 | — | — |
| Abrasion Resistance (mg loss), ASTM D-1044 (Taber, H18, 1000 g, 1000 cycles) | 21 | 21 | 37 | 38 |
| Coefficient of Friction on galvanized steel, ASTM 1894-01 | | | | |
| Static | 1.37 | 1.11 | 1.03 | 0.74 |
| Kinetic | 1.29 | 1.02 | 0.92 | 0.65 |
| Change in Tensile Strength after | | | | |

TABLE 2-continued

|  | Example 5 | Example 6 | Example 7 | Example 8 |
|---|---|---|---|---|
| Heat Aging in Air for 1008 hrs (%), ASTM D-573-99 | | | | |
| 120° C. | +97 | +6.1 | +18 | +18 |
| 150° C. | −44 | −35 | +0.8 | −1.8 |
| Change in Elongation at Break after Heat Aging in Air for 1008 hrs (%), ASTM D-573-99 | | | | |
| 120° C. | +18 | +2.7 | −5.4 | +17 |
| 150° C. | −36 | −25 | −42 | −19 |
| Change in Hardness after Heat Aging in Air for 1008 hrs (Point Change), ASTM D-573-99 | | | | |
| 120° C. | +3 | −5 | +1 | +2 |
| 150° C. | −13 | −13 | −3 | +10 |
| Change in Tensile Strength after water immersion at 100° C. (%) | | | | |
| 250 hrs | +18 | +4.8 | +9.9 | −18 |
| 500 hrs | −5.6 | −5.6 | — | — |
| 1008 hrs | +4.1 | — | — | — |
| Change in Elongation at Break after water immersion at 100° C. (%) | | | | |
| 250 hrs | −3.9 | −0.8 | −1.7 | −11 |
| 500 hrs | 0 | +14 | — | — |
| 1008 hrs | −2.0 | — | — | — |
| Change in Hardness after water immersion at 100° C. (%) | | | | |
| 250 hrs | 0 | −2 | 0 | +4 |
| 500 hrs | 0 | −2 | — | — |
| 1008 hrs | −1 | — | — | — |
| Volume Swell in Transmission Oil 90 at 60° C. for 1 hour (%) | −1.6 | +1.1 | — | — |
| Volume Swell in SAE 30 wt Motor Oil at 60° C. for 1 hour (%) | −1.8 | +1.2 | — | — |
| Volume Swell in Standard Grade Diesel Fuel at 60° C. for 1 hour (%) | +8.1 | +7.8 | — | — |
| Volume Swell in Ethylene glycol/DIH$_2$O @ 50/50 ratio at 60° C. for 1 hour (%) | +0.4 | +1.3 | — | — |
| Volume Swell in ASTM 903 Oil at 60° C. for 1 hour (%) | +0.6 | +3.4 | — | — |

[1] Annealed at 120° C. in air for 22 hr

Examples 9–12

Polyurethane-silicone elastomer compositions were prepared according to the procedure described supra, using various polyurethane elastomers. In particular, "ester" vs "ether" type of polyurethanes were prepared. The physical properties were evaluated initially, and after heat aging for 1008 hours at 120° C. and 150° C. The formulation and resulting physical properties are summarized in Table 3.

TABLE 3

|  | Example 9 | Example 10 | Example 11 | Example 12 |
|---|---|---|---|---|
| Formulation (wt %) | | | | |
| TPU 4 | 48.35% | | | |
| TPU 8 | | 48.35% | | |
| TPU 6 | | | 48.35% | |
| TPU 9 | | | | 48.35% |

TABLE 3-continued

|  | Example 9 | Example 10 | Example 11 | Example 12 |
|---|---|---|---|---|
| BASE 1 | 48.35% | 48.35% | | |
| BASE 2 | | | 48.35% | 48.35% |
| X LINKER | 2.3% | 2.3% | 2.3% | 2.3% |
| CATALYST | 0.1% | 0.1% | 0.1% | 0.1% |
| 200 fluid (1000 cSt) | 0.9% | 0.9% | 0.9% | 0.9% |
| Properties | | | | |
| Hardness (Shore A) | 59 | 62 | 66 | 66 |
| Tensile Strength (MPa) | 10 | 11 | 18 | 15 |
| Elongation at Break (%) | 550 | 490 | 640 | 660 |
| Tensile Set at Break (%) | 28 | 34 | 96 | 68 |
| Tear Strength (N/mm) | 28 | 27 | 58 | 42 |
| Compression set after 22 hrs (%) | | | 32 | — |
| Room Temperature | — | — | 68 | 75 |
| 70° C. | — | — | — | — |
| 70° C. after annealed[1] | 82 | — | 91 | 94 |
| Change in Tensile Strength after Heat Aging in Air for 1008 hrs (%) | | | | |
| 120° C. | +50 | −3.8 | +11 | −35 |
| 150° C. | −20 | +7.6 | −8.7 | −14 |
| Change in Elongation at Break after Heat Aging in Air for 1008 hrs (%) | | | | |
| 120° C. | +19 | −1.2 | +9.4 | −16 |
| 150° C. | −16 | −90 | −14 | −96 |
| Change in Hardness after Heat Aging in Air for 1008 hrs (Point Change) | | | | |
| 120° C. | −6 | −6 | +15 | −2 |
| 150° C. | −7 | +30 | +20 | +25 |
| Volume Swell in Transmission Oil 90 at 60° C. for 1 hour (%) | — | — | +1.0 | +1.3 |
| Volume Swell in SAE 30 wt Motor Oil at 60° C. for 1 hour (%) | — | — | +0.8 | +1.7 |
| Volume Swell in Standard Grade Diesel Fuel at 60° C. for 1 hour (%) | — | — | +3.8 | +8.0 |
| Volume Swell in Ethylene glycol/DIH$_2$O @ 50/50 ratio at 60° C. for 1 hour (%) | — | — | +1.5 | +0.9 |
| Volume Swell in ASTM 903 Oil at 60° C. for 1 hour (%) | — | — | +2.9 | +4.6 |

[1] Annealed at 120° C. in air for 22 hrs

Example 13–16

Polyurethane-silicone elastomer compositions were prepared according to the procedure described supra, using various silicone bases. The physical properties were evaluated initially, and after heat aging for 1008 hours at 120° C. and 150° C. The formulation and resulting physical properties are summarized in Table 4.

TABLE 4

|  | Example 13 | Example 14 | Example 15 | Example 16 |
|---|---|---|---|---|
| Formulation (wt %) | | | | |
| TPU 1 | 48.35% | 38.45% | 48.35% | 48.35% |
| BASE 2 | 48.35% | 57.63% | | |
| BASE 1 | | | 48.35% | |
| BASE 3 | | | | 48.35% |
| X LINKER | 2.3% | 2.73% | 2.3% | 2.3% |

TABLE 4-continued

|  | Example 13 | Example 14 | Example 15 | Example 16 |
|---|---|---|---|---|
| CATALYST | 0.1% | 0.12% | 0.1% | 0.1% |
| 200 fluid (1000 cSt) | 0.9% | 1.07% | 0.9% | 0.9% |
| Properties |  |  |  |  |
| Hardness (Shore A) | 50 | 50 | 47 | 45 |
| Ultimate Tensile Strength (MPa) | 9.3 | 5.6 | 5.9 | 6.9 |
| Elongation at Break (%) | 730 | 700 | 470 | 680 |
| Tensile Set at Break (%) | — | — | — | — |
| Tear Strength (N/mm) | 46 | 39 | 19 | 25 |
| Compression set after 22 hrs (%) |  |  |  |  |
| Room Temperature | — | — | — | — |
| 70° C. | 60 | 59 | 45 | 51 |
| 70° C. after annealed[1] | 40 | — | 29 | — |
| 120° C. | 91 | 80 | 74 | 86 |
| 120° C. after annealed[1] | 57 | — | 48 | — |
| Change in Tensile Strength after Heat Aging in Air for 1008 hrs (%) |  |  |  |  |
| 120° C. | +49 | +89 | +130 | +100 |
| 150° C. | 0 | +21 | −36 | −12 |
| Change in Elongation at Break after Heat Aging in Air for 1008 hrs (%) |  |  |  |  |
| 120° C. | −18 | −11 | +20 | −3.3 |
| 150° C. | −17 | −28 | −33 | −29 |
| Change in Hardness after Heat Aging in Air for 1008 hrs (Point Change) |  |  |  |  |
| 120° C. | +16 | +14 | +8 | +9 |
| 150° C. | +2 | +8 | −8 | −3 |
| Volume Swell in Transmission Oil 90 at 60° C. for 1 hour (%) | −2.2 | −1.4 | −2.0 | −2.3 |
| Volume Swell in SAE 30 wt Motor Oil at 60° C. for 1 hour (%) | −2.8 | −2.1 | −3.2 | −3.6 |
| Volume Swell in Standard Grade Diesel Fuel at 60° C. for 1 hour (%) | +6.5 | +13 | +9.5 | +6.4 |
| Volume Swell in Ethylene glycol/DIH$_2$O @ 50/50 ratio at 60° C. for 1 hour (%) | +0.4 | +0.5 | −1.4 | +0.6 |
| Volume Swell in ASTM 903 Oil at 60° C. for 1 hour (%) | — | — | — | — |

[1]Annealed at 120° C. in air for 22 hrs

Example 17–21

Comparative Examples

Polyurethane-silicone elastomer compositions were prepared according to the procedure described supra, and compared to simple blends of the corresponding TPUs and silicone bases, that is, without using dynamic vulcanization techniques. The formulation and resulting physical properties are summarized in Table 5.

The simple blends were too soft and tacky to pelletize using traditional water bath cooling and strand cutter for certain physical property evaluations. Also, the simple blends exhibited severe delamination (layering, phase separation) upon injection molding. Furthermore, the simple blends exhibited lower mechanical properties (tensile strength, elongation at break) as well as less elastic properties (tensile set and compression set), as compared to the polyurethane-silicone elastomers prepared using dynamic vulcanization techniques. Thus, these simple blends were not re-processable.

TABLE 5

| Formulation (wt %) |  |  |  |  |
|---|---|---|---|---|
| TPU 10 | 50% | 48.35% | 50% | 48.35% |
| BASE 2 | 50% | 48.35% |  |  |
| BASE 1 |  |  | 50% | 48.35% |
| X LINKER |  | 2.3% |  | 2.3% |
| CATALYST |  | 0.1% |  | 0.1% |
| 200 fluid (1000 cSt) |  | 0.9% |  | 0.9% |
| Properties |  |  |  |  |
| Hardness (Shore A) | 53 | 68 | 52 | 61 |
| Ultimate Tensile Strength (MPa) | 9.3 | 17 | 6 | 11 |
| Elongation at Break (%) | 490 | 620 | 460 | 500 |
| Tensile Set |  |  |  |  |
| 300% elongation | 48 | 33 | 47 | 22 |
| At Break (%) | 60 | 40 | 40 | 24 |
| Compression set after 22 hrs (%) |  |  |  |  |
| Room Temperature | 35 | 24 | 29 | 19 |
| 70° C. | — | — | 82 | 61 |
| 120° C. | — | — | 96 | 77 |

We claim:

1. A thermoplastic elastomer composition comprising;
   (A) a thermoplastic polyurethane polymer,
   (B) a silicone elastomer, wherein
   the silicone elastomer is the reaction product of a dynamic vulcanization comprising:
   (B') 100 parts by weight of a diorganopolysiloxane gum having a Williams plasticity of at least 30 and having an average of at least 2 alkenyl groups in its molecule and, optionally,
   (B") up to 200 parts by weight of a reinforcing filler,
   (C) an organohydrido silicon compound which contains an average of at least 2 silicon-bonded hydrogen groups in its molecule and
   (D) a hydrosilation catalyst,
   where components (C) and (D) are present in an amount sufficient to cure said diorganopolysiloxane (B'), wherein
   the weight ratio of the silicone elastomer to the thermoplastic polyurethane polymer is from 5:95 to 85:15, and the thermoplastic elastomer composition is re-processable.

2. The thermoplastic elastomer composition of claim 1 wherein the weight ratio of silicone elastomer (B) to thermoplastic polyurethane polymer (A) is 30:70 to 70:30.

3. The thermoplastic elastomer composition of claim 1 wherein the weight ratio of silicone elastomer (B) to thermoplastic polyurethane polymer (A) is 40:60 to 60:40.

4. The thermoplastic elastomer composition of claim 1 wherein the composition's mechanical properties selected from tensile strength, elongation at break, and hardness of the thermoplastic elastomer composition decreases no more than 60% from original value after heat aging the thermoplastic elastomer composition at 120° C. for at least 1000 hours.

5. The thermoplastic elastomer composition of claim 1 wherein the composition's mechanical properties selected from tensile strength, elongation at break, hardness of the thermoplastic elastomer composition decreases no more than 40% from its original value after heat aging the thermoplastic elastomer composition at 120° C. for at least 1000 hours.

6. The thermoplastic elastomer composition of claim 1 wherein the composition's mechanical properties selected from tensile strength, elongation at break, and hardness of the thermoplastic elastomer composition decreases no more than 30% from its original value after heat aging the thermoplastic elastomer composition at 120° C. for at least 1000 hours.

7. The thermoplastic elastomer composition of claim 1 wherein the hardness of the thermoplastic elastomer composition as measured by ASTM D2240 decreases no more than 40% from its original value after heat aging the thermoplastic elastomer composition at 120° C. for at least 1000 hours.

8. The thermoplastic elastomer composition of claim 1 wherein the hardness of the thermoplastic elastomer composition as measured by ASTM D2240 decreases no more than 30% from its original value after heat aging the thermoplastic elastomer composition at 120° C. for at least 1000 hours.

9. The thermoplastic elastomer composition of claim 1 wherein the thermoplastic polyurethane polymer is a thermoplastic polyurethane elastomer.

10. The thermoplastic elastomer composition of claim 1 wherein the diorganopolysiloxane (B') is a gum selected from a copolymer consisting essentially of dimethylsiloxane units and methylvinylsiloxane units and a copolymer consisting essentially of dimethylsiloxane units and methylhexenylsiloxane units and the reinforcing filler (B") is present and is a funed silica.

11. The thermoplastic elastomer composition of claim 1 wherein component (C) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa.s at 25° C.

12. The thermoplastic elastomer composition of claim 1 wherein the catalyst (D) is a neutralized complex of platinous chloride and divinyltetramethyldisiloxane.

13. The thermoplastic elastomer composition of claim 1 further comprising (E) a stabilizer.

14. The thermoplastic elastomer composition of claim 13 wherein the stabilizer is at least one organic compound selected from hindred phenols; thioesters; hindered amines; 2,2'-(1,4-phenylene)bis(4H-3, 1-benzoxazin-4-one); or 3,5-di-tert-butyl-4-hydroxybenzoic acid, hexadecyl ester.

15. A method for preparing a thermoplastic customer comprising:
(I) mixing
(A) a thermoplastic polyurethane polymer,
(B) a silicone base comprising
(B') 100 parts by weight of a diorganopolysiloxane gum having a Williams plasticity of at least 30 and having an average of at least 2 alkenyl groups in its molecule and, optionally,
(B") up to 200 parts by weight of a reinforcing filler, the weight ratio of said silicone base to said thermoplastic polyurethane polymer is from 35:65 to 85:15,
(C) an organohydrido silicon compound which contains an average of at least 2 silicon-bonded hydrogen groups in its molecule and
(D) a hydrosilation catalyst,
components (C) and (D) being present in an amount sufficient to cure said diorganopolysiloxane (B'); and
(II) dynamically vulcanizing said diorganopolysiloxane (B').

16. The method of claim 15 wherein the thermoplastic polyurethane polymer is a thermoplastic polyurethane elastomer.

17. The method of claim 15 wherein the diorganopolysiloxane (B') is a gum selected from a copolymer consisting essentially of dimethylsiloxane units and methylvinylsiloxane units and a copolymer consisting essentially of dimethylsiloxane units and methylhexenylsiloxane units and the reinforcing filler (B") is present and is a fumed silica.

18. The method of claim 15 wherein component (C) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa.s at 25° C.

19. The method of claim 15 wherein the catalyst (D) is a neutralized complex of platinous chloride and divinyltetramethyldisiloxane.

20. The method of claim 15 further comprising (E) a stabilizer.

21. The thermoplastic elastomer composition of claim 15 wherein the stabilizer is at least one organic compound selected from hundred phenols; thioesters; hindered amines; 2,2'-(1,4-phenylene)bis(4H-3, 1-benzoxazin-4-one); or 3,5-di-tert-butyl-4-hydroxybenzoic acid, hexadecyl ester.

22. The product produced by the method of claim 15.
23. The product produced by the method of claim 16.
24. The product produced by the method of claim 17.
25. The product produced by the method of claim 18.
26. The product produced by the method of claim 19.
27. The product produced by the method of claim 20.
28. The product produced by the method of claim 21.

* * * * *